United States Patent
Miville et al.

(10) Patent No.: US 10,599,931 B2
(45) Date of Patent: Mar. 24, 2020

(54) AUTOMATED DRIVING SYSTEM THAT MERGES HETEROGENOUS SENSOR DATA

(71) Applicant: 2236008 Ontario Inc., Waterloo (CA)

(72) Inventors: Xavier Miville, Gatineau (CA); Christian Joseph Eric Montminy, Ottawa (CA)

(*) Notice: Subject to any disclaimer, the term of this patent is extended or adjusted under 35 U.S.C. 154(b) by 0 days.

(21) Appl. No.: 15/681,891

(22) Filed: Aug. 21, 2017

(65) Prior Publication Data

US 2019/0057263 A1 Feb. 21, 2019

(51) Int. Cl.
| | |
|---|---|
| G05D 1/00 | (2006.01) |
| G06K 9/00 | (2006.01) |
| H04L 29/08 | (2006.01) |
| G01S 17/02 | (2020.01) |
| G05D 1/02 | (2020.01) |
| G01S 13/86 | (2006.01) |
| G01S 17/93 | (2020.01) |
| G01S 13/931 | (2020.01) |
| G01S 13/93 | (2020.01) |
| G01S 7/295 | (2006.01) |

(52) U.S. Cl.
CPC ........ *G06K 9/00805* (2013.01); *G01S 13/865* (2013.01); *G01S 13/867* (2013.01); *G01S 13/931* (2013.01); *G01S 17/023* (2013.01); *G01S 17/936* (2013.01); *G05D 1/0061* (2013.01); *G05D 1/024* (2013.01); *G05D 1/0246* (2013.01); *H04L 67/12* (2013.01); *G01S 7/2955* (2013.01); *G01S 2013/935* (2013.01); *G01S 2013/9342* (2013.01); *G01S 2013/9346* (2013.01); *G01S 2013/9367* (2013.01); *G05D 2201/0213* (2013.01); *G06T 2207/30261* (2013.01)

(58) Field of Classification Search
CPC .............. G06K 9/00805; G01S 17/023; G05D 1/0061; G05D 1/024; G05D 1/0246; G05D 2201/0213; H04L 67/12; G06T 2207/30261
USPC .......................................... 701/301; 382/218
See application file for complete search history.

(56) References Cited

U.S. PATENT DOCUMENTS

| | | | |
|---|---|---|---|
| 9,360,867 B2 | 6/2016 | Ju et al. | |
| 9,672,446 B1* | 6/2017 | Vallespi-Gonzalez | ...................... G06K 9/6267 |
| 2011/0285622 A1* | 11/2011 | Marti | ...................... G06T 15/20 345/158 |
| 2014/0032012 A1 | 1/2014 | Joshi | |

(Continued)

OTHER PUBLICATIONS

European Search Report for corresponding EP 18187684.8-1206 dated Jan. 25, 2019.

*Primary Examiner* — Marthe Y Marc-Coleman

(57) ABSTRACT

An automated driving system comprising a first sensor providing first sensor data, a second sensor providing second sensor data, wherein the first and second sensors are different types of sensors and a processor communicatively coupled to the first sensor and the second sensor. The processor is configured to transform the first and second sensor data into a common three-dimensional coordinate system to create a representation of an image for a field of view corresponding to a direction of travel, identify one or more objects in the field of view, and generate one or more drive control signals to control a motion of the vehicle in response to the one or more objects in the field of view.

15 Claims, 10 Drawing Sheets

(56) References Cited

U.S. PATENT DOCUMENTS

| | | | |
|---|---|---|---|
| 2014/0195138 A1* | 7/2014 | Stelzig | G08G 1/0116 |
| | | | 701/119 |
| 2015/0266472 A1 | 9/2015 | Ferguson | |
| 2016/0026255 A1* | 1/2016 | Katz | G06K 9/00201 |
| | | | 345/156 |
| 2016/0238703 A1 | 8/2016 | Liu | |
| 2017/0248963 A1* | 8/2017 | Levinson | G05D 1/0278 |
| 2017/0277716 A1* | 9/2017 | Giurgiu | G06F 17/30241 |
| 2017/0345321 A1* | 11/2017 | Cross | G08G 5/045 |
| 2017/0359561 A1* | 12/2017 | Vallespi-Gonzalez | |
| | | | H04N 13/0022 |
| 2018/0025234 A1* | 1/2018 | Myers | G06K 9/00798 |
| 2018/0032042 A1* | 2/2018 | Turpin | G05B 15/02 |
| 2018/0032822 A1* | 2/2018 | Frank | B60R 1/00 |
| 2018/0056515 A1* | 3/2018 | Boca | B25J 9/1697 |
| 2018/0088584 A1* | 3/2018 | Tascione | G05D 1/0231 |
| 2018/0272963 A1* | 9/2018 | Meyhofer | B60W 50/023 |

* cited by examiner

AUTOMATED DRIVING SYSTEM THAT MERGES HETEROGENOUS SENSOR DATA

TECHNICAL FIELD

The present technology relates generally to automated driving systems and, in particular, to processing sensor data for such systems.

BACKGROUND

The Society of Automotive Engineers (SAE) International's standard J3016 defines various degrees of automated driving: no automation, driver assistance, partial automation, conditional automation, high automation, and full automation. For the purposes of this specification, all of these (except for no automation) are referred to herein as "automated driving". For the purposes of this specification, the expression "automated driving system" includes advanced driver-assistance systems and autonomous driving systems or other such self-driving systems that provide at least some degree of assistance of autonomy in the driving of a vehicle.

Automated driving systems utilize sensors to capture sensor data characterizing the surrounding environment of the vehicle. Automated driving systems typically include one or more processors onboard the vehicle to process the sensor data and to provide control signals to the steering, braking and/or acceleration subsystems of the vehicle. Sensors on the vehicle may include RADAR, LIDAR, and cameras. Ultrasonic sensors may also be used for short-range guidance, e.g. parking.

Combining real-time sensor data from multiple sensors for computationally efficient control of the vehicle is extremely challenging. Improvements in this technology are thus highly desirable.

BRIEF DESCRIPTION OF THE DRAWINGS

Further features and advantages of the present technology will become apparent from the following detailed description, taken in combination with the appended drawings, in which.

It will be noted that throughout the appended drawings like features are identified by like reference numerals.

DETAILED DESCRIPTION

Figure 1:
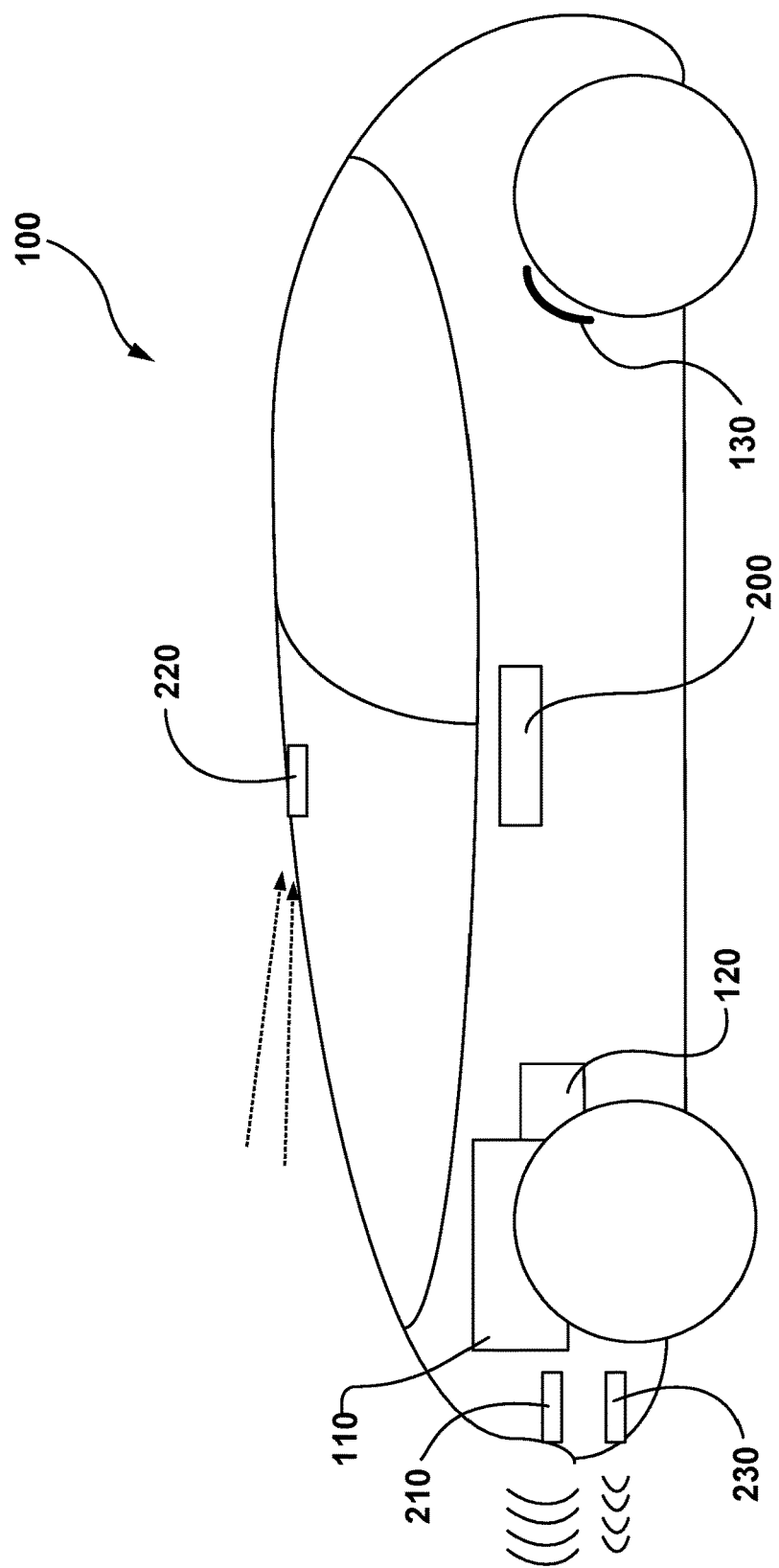
FIG. 1 is a schematic depiction of a vehicle equipped with an automated driving system.

Disclosed in this specification and illustrated in the drawings is an automated driving system for a vehicle that merges sensor data from different types of sensors. The vehicle may be an automobile, e.g. a car, truck, van, bus or any land-based vehicle. The technology, or particular elements and aspects of the technology, may be used or adapted for use with watercraft or aircraft. The vehicle may be a manned vehicle (with a driver or pilot) or an unmanned vehicle, e.g. a drone or robotic vehicle having no human operator onboard.

Accordingly, one aspect of the present disclosure is automated driving system comprising a first sensor providing first sensor data, a second sensor providing second sensor data, wherein the first and second sensors are different types of sensors and a processor communicatively coupled to the first sensor and the second sensor. The processor is configured to transform the first and second sensor data into a common three-dimensional coordinate system to create a representation of an image for a field of view corresponding to a direction of travel, identify one or more objects in the field of view, and generate one or more drive control signals to control a motion of the vehicle in response to the one or more objects in the field of view.

Another aspect of the present disclosure is a non-transitory computer-readable medium comprising instructions in code which when loaded into a memory and executed by a processor of a vehicle cause the processor to receive first sensor data from a first sensor, receive second sensor data from a second sensor of a type different from the first sensor, and merge the first and second sensor data into a common three-dimensional coordinate system to create a representation of an image for a field of view corresponding to a direction of travel. The code causes the processor to identify one or more objects in the field of view and generate one or more drive control signals to control a motion of the vehicle in response to the one or more objects in the field of view.

Yet another aspect of the present technology is a vehicle comprising a powertrain, a braking system, a steering system and an automated driving system for at least partially controlling one or more of the powertrain, braking system and steering system. The automated driving system includes a first sensor providing first sensor data, a second sensor providing second sensor data, wherein the first and second sensors are different types of sensors and a processor communicatively coupled to the first sensor and the second sensor. The processor is configured to merge the first and second sensor data into a common three-dimensional coordinate system for a field of view corresponding to a direction of travel, identify one or more objects in the field of view and generate one or more drive control signals to control a motion of the vehicle in response to the one or more objects in the field of view.

The details and particulars of these aspects of the technology will now be described below, by way of example, with reference to the drawings.

To improve decision-making by automated driving systems (e.g. advanced driver-assistance or autonomous driving systems), it is beneficial to use multiple diverse types of sensors. The raw sensor data from the diverse multiple sensors are combined or merged into useful object tracking information such as position, size, depth, velocity, and object type. This information enables a processor of a self-driving system to make intelligent decisions with respect to path-finding and collision avoidance. Utilizing multiple sensors of different types also provides different characterization capabilities, robustness and physical properties. For example, monoscopic cameras with machine vision algorithms can give sizing and classification information about objects whereas RADAR and LIDAR exploit time-of-flight and other techniques to accurately measure distance, angle and velocity. On the other hand, it is difficult to obtain accurate sizing and object recognition using RADAR and LIDAR. Also, it is difficult to determine distance and velocity information from camera images. Distance is an important variable for effective velocity control, particularly for adaptive cruise control and emergency braking. Dimensions of objects are important variables for path-finding.

In the embodiment depicted by way of example in FIG. 1, an automated vehicle denoted by reference numeral 100 includes a powertrain 110, a steering system 120 and a braking system 130. The powertrain 110 may include an accelerator, an internal combustion engine (e.g. gasoline or diesel) and a transmission to mechanically transfer power to the drive wheels. Alternatively, the powertrain may include an electric motor or multiple electric motors. Still alternatively, the powertrain may be a hybrid powertrain with both a gas engine and an electric motor. The vehicle may be a four-wheeled automobile or car as shown by way of example in FIG. 1. However, other types of vehicles (e.g. trucks, buses, etc.) may implement the present technology.

In the embodiment depicted in FIG. 1, the vehicle includes an automated driving system 200 for at least partially controlling one or more of the powertrain 110, the steering system 120 and the braking system 130. The automated driving system 200 includes a first sensor 210 providing first sensor data and a second sensor 220 providing second sensor data. The first and second sensors are different types of sensors. The vehicle may include a third sensor 230. The vehicle may include additional sensors (i.e. fourth, fifth, sixth sensors etc.) For example, in one embodiment, the first sensor 210 may be RADAR and the second sensor 220 may be a camera. In the illustrated embodiment, the third sensor 230 is LIDAR. In other embodiments, the vehicle may have any suitable combination of at least two different types of sensors, e.g. RADAR and camera, LIDAR and camera, RADAR and LIDAR, or a combination of RADAR, camera and LIDAR. The vehicle may include other types of sensors such as ultrasonic sensors for proximity detection (e.g. parking). The vehicle may have a Global Navigation Satellite System (GNSS) receiver, e.g. a Global Positioning System (GPS) sensor for position determination. It will be appreciated that the vehicle may include multiple sensors of the same type, such as multiple cameras and/or multiple RADAR or LIDAR subsystems.

Figure 2:
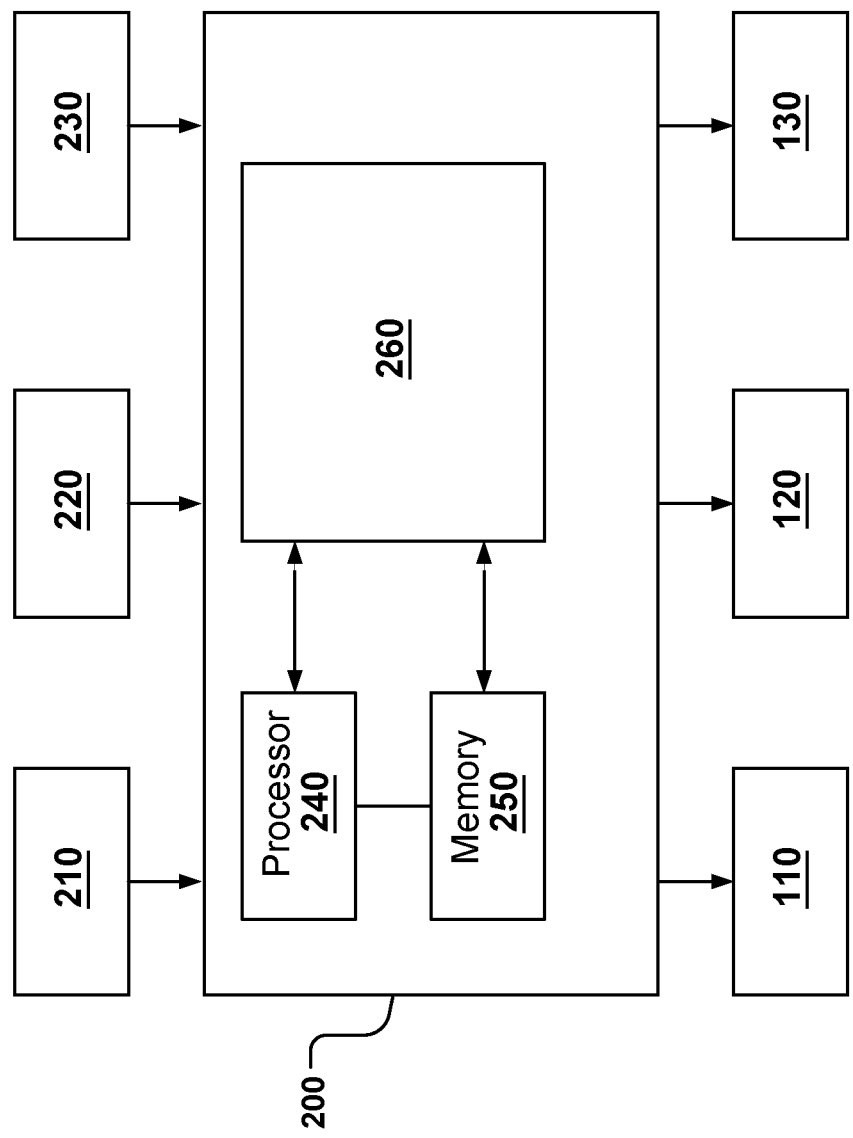
FIG. 2 is a schematic depiction of the automated driving system.

In the embodiment depicted by way of example in FIG. 2, the automated driving system 200 includes a processor 240 communicatively coupled to a memory 250. The processor 240 and the memory 250 are communicatively coupled to the first sensor and the second sensor. In one embodiment, the first sensor is RADAR and the second sensor is a camera. In another embodiment, the first sensor is LIDAR and the second sensor is a camera. In other embodiments, there may be different combinations of RADAR, LIDAR, cameras, or other sensors.

The processor 240 is configured to transform and/or merge the first and second sensor data into a common three-dimensional coordinate system for a field of view corresponding to a direction of travel. The common coordinate system may be a standard Cartesian coordinate system. The processor 240 may execute a common coordinate software module 260 for merging and transforming the sensor data. Transformed sensor data may be stored in the memory 250. The processor 240 is configured to identify one or more objects (other vehicles, pedestrians, buildings, roads, traffic lights, traffic signs, etc.) in the field of view. The field of view may be a rectangular bounding box in the forward direction. In some embodiments, there may be a rear field of view for when the vehicle is in reverse or side fields of view when crossing intersections or navigating lanes. The processor is configured to generate one or more drive control signals to control a motion of the vehicle in response to the one or more objects in the field of view. The drive control signals enable the vehicle to drive autonomously or semi-autonomously over a road, avoiding collisions with other vehicles, pedestrians, etc. Controlling a motion of the vehicle includes acceleration, braking and steering. The drive control signals thus may include an acceleration signal, a braking signal and a steering signal. Other drive control signals may be possible, e.g. a signal to automatically change gears in the transmission, change driving modes (e.g. sport, comfort, economy), turn on/off headlights, activate turn signals, etc.

The processor, in one embodiment, is configured to apply a first weight to the first sensor data and a second weight to the second sensor data. In one particular implementation, the first weight and second weight are based on manufacturer-specified sensitivity data. In another implementation, the first weight and second weight are based on environmental conditions. In one embodiment, the first and second weights may be dynamically adjusted in response to detecting changing environmental conditions. For example, a camera (except for an infrared camera) is more reliable during daytime than during nighttime. Thus, as night falls, the vehicle's camera will become progressively less reliable. The weight given to the camera data may thus be decreased as the ambient light diminishes. As another example, if the vehicle enters a dark tunnel, the weight for the camera data may be diminished. When the vehicle subsequently emerges from the dark tunnel, the weight applied to the camera data may be increased. Similarly, LIDAR devices may be affected by reflection from snow, refraction through dense rain or absorption of certain materials. RADAR devices can be subjected to propagation or electromagnetic interference.

Figure 3:
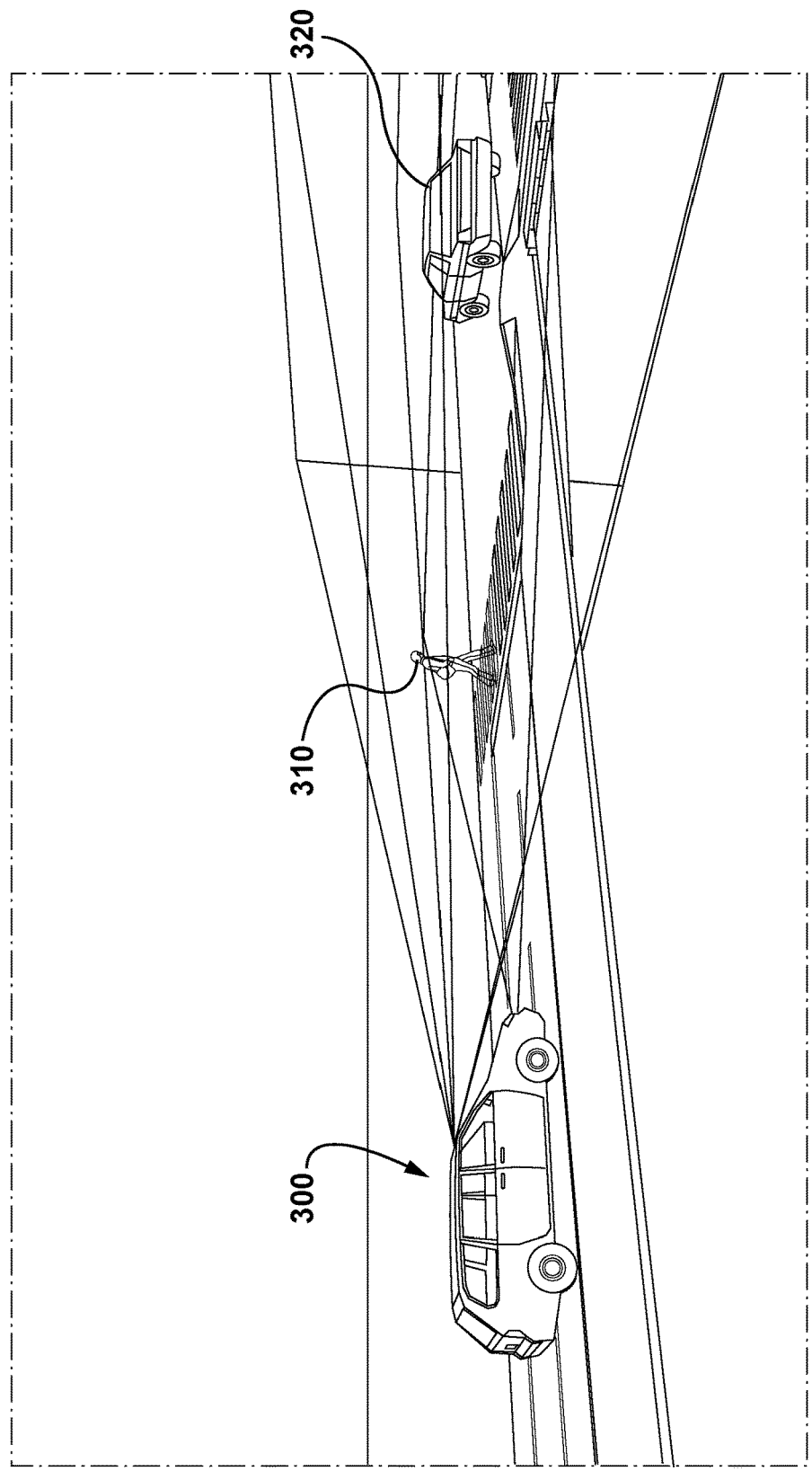
FIG. 3 depicts an example of the automated driving system sensing objects in a field of view.

FIG. 3 depicts an example of an automated driving system sensing objects in a field of view. In FIG. 3, a vehicle 300 having the automated driving system is configured to sense a pedestrian 310 and a car 320 (objects of interest) in its forward field of view. For example, in this particular embodiment, the automated driving system has three different types of sensors, namely a LIDAR, a RADAR and a camera. Each of these three sensors is characterized by a three-dimensional position coordinate describing its position relative to a common origin on the vehicle, e.g. a midpoint of the rear axle of the vehicle, or a center of gravity of the vehicle, or any other suitable origin. Each sensor may be further characterized by a directionality of the sensor. Furthermore, each sensor may be characterized by a manufacturer-prescribed range and horizontal field of view (HFOV). The LIDAR may have a manufacturer-prescribed range, e.g. 200 meters, and a horizontal field of view, e.g. 45 degrees. The RADAR may have a manufacturer-prescribed range, e.g. 175 meters, and a 90-degree horizontal field of view. The camera may have a 48-degree horizontal field of view.

Figure 4:
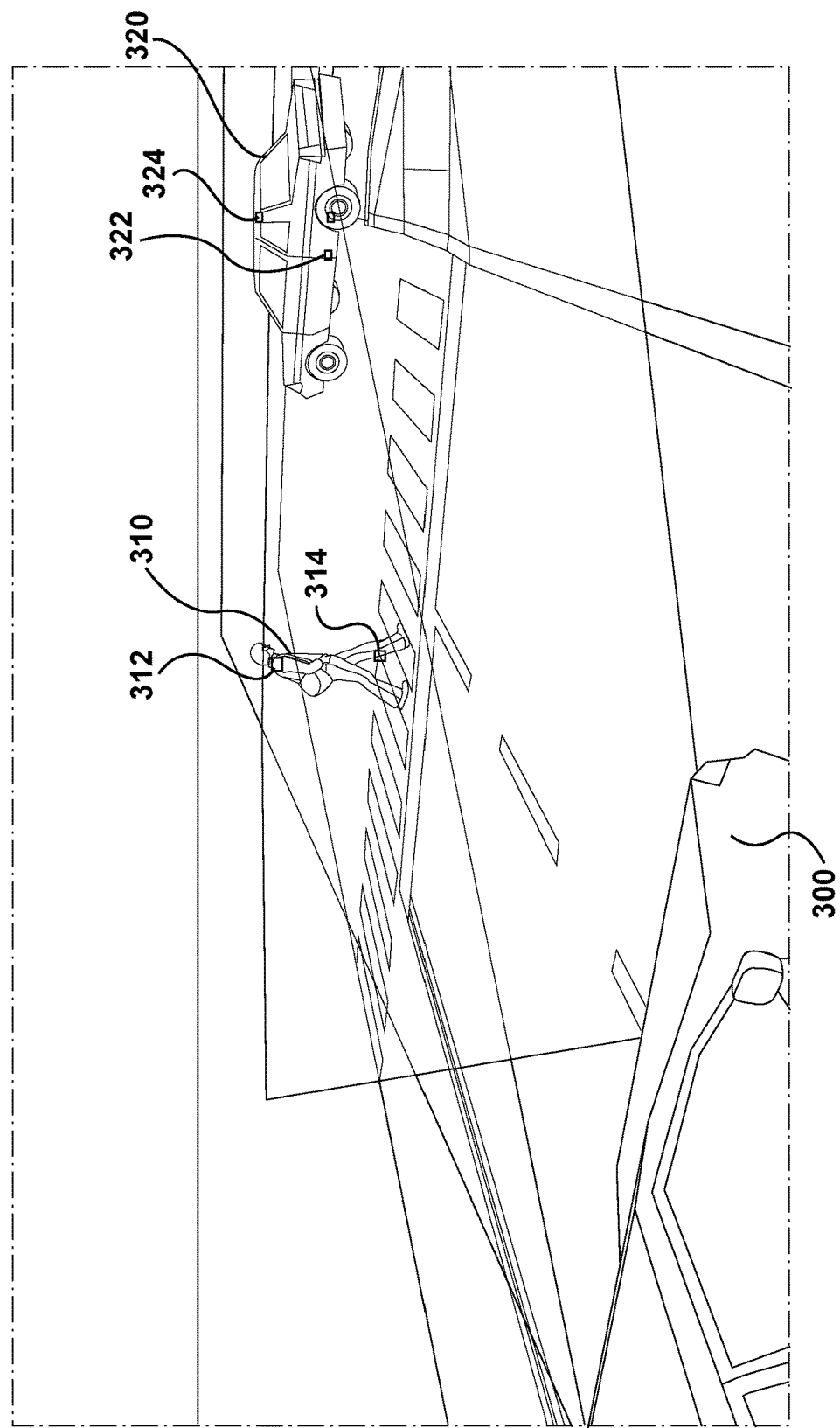
FIG. 4 depicts example readings obtained by the LIDAR and RADAR sensors of the automated driving system of FIG. 3.

FIG. 4 depicts example readings 310, 312, 322, 324 taken by the LIDAR and RADAR sensors of the automated driving system of FIG. 3. In the example of FIG. 4, the LIDAR takes a LIDAR reading 312 on the pedestrian 310. The LIDAR also takes a LIDAR reading 324 on the car. The RADAR takes a RADAR reading 314 on the pedestrian and a RADAR reading 322 on the car. Each reading is characterized by a distance and azimuth from which a position can be computed relative to the vehicle, specifically the vehicle's origin. The readings may also provide a velocity vector or velocity components that characterize how fast the vehicle and object are approaching each other (in a direction of travel) and a lateral velocity orthogonal to the direction of travel.

Figure 5:
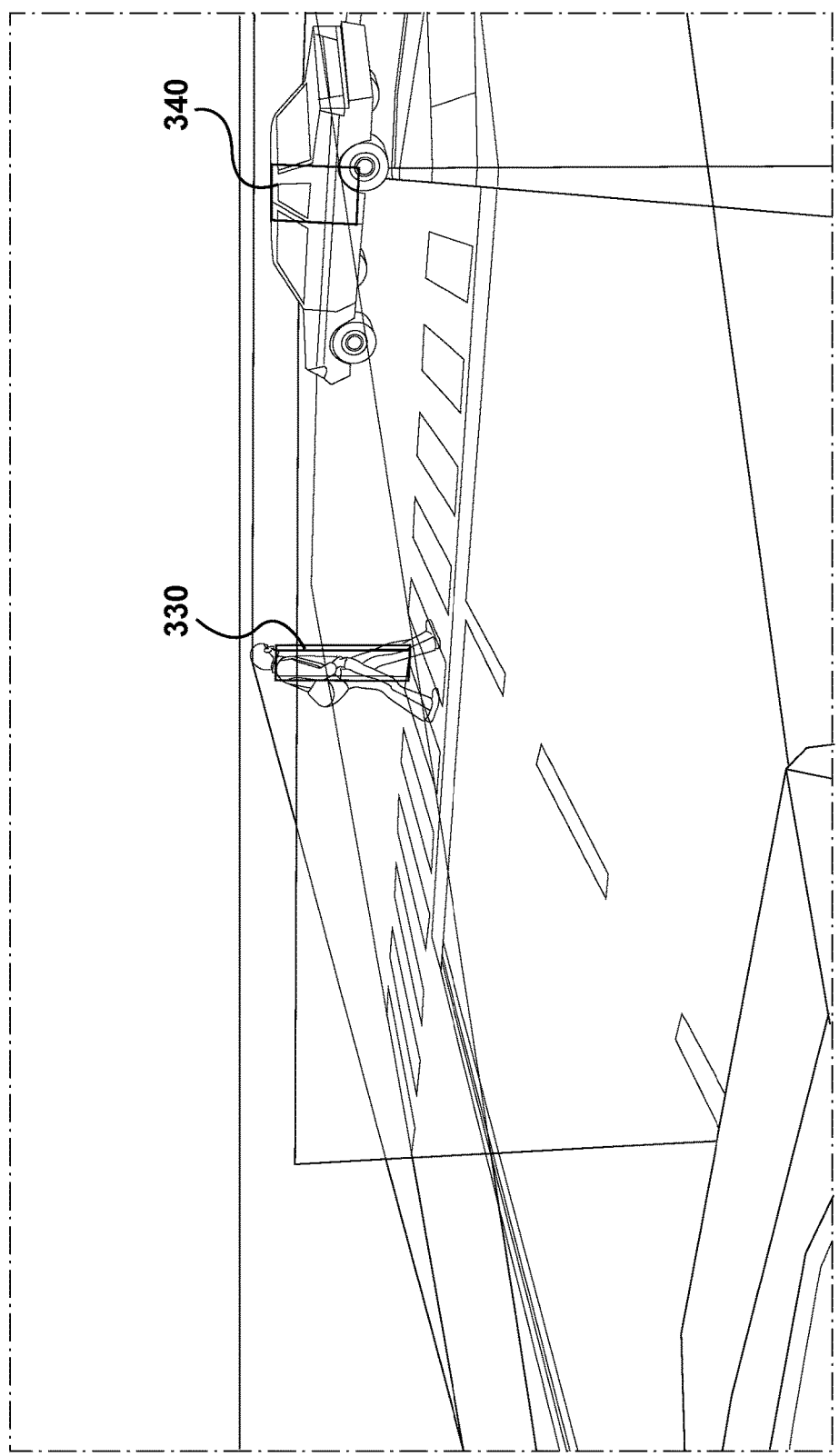
FIG. 5 depicts the creation of three-dimensional fused objects (FO's) obtained from the correlation of the previously taken readings by the automated driving system.

FIG. 5 depicts the creation of fused objects (FO's) obtained from the correlation of the previously taken LIDAR and RADAR sensor readings. It is implied here that the readings were initially converted to individual objects-of-interest (OOI's) at different moments for each of the sensors, for example initially creating FO's with the first incoming OOI's from the LIDAR, then augmenting the FO's characteristic with incoming OOI's from the RADAR based on clustering criteria. As shown by way of example in FIG. 5, a first FO 330 and a second FO 340 are created for the pedestrian and the car, which are the two visible objects in the field of view. Each FO is characterized by position and bounds coordinates relative to the origin, a velocity vector and a certainty.

Figure 6:
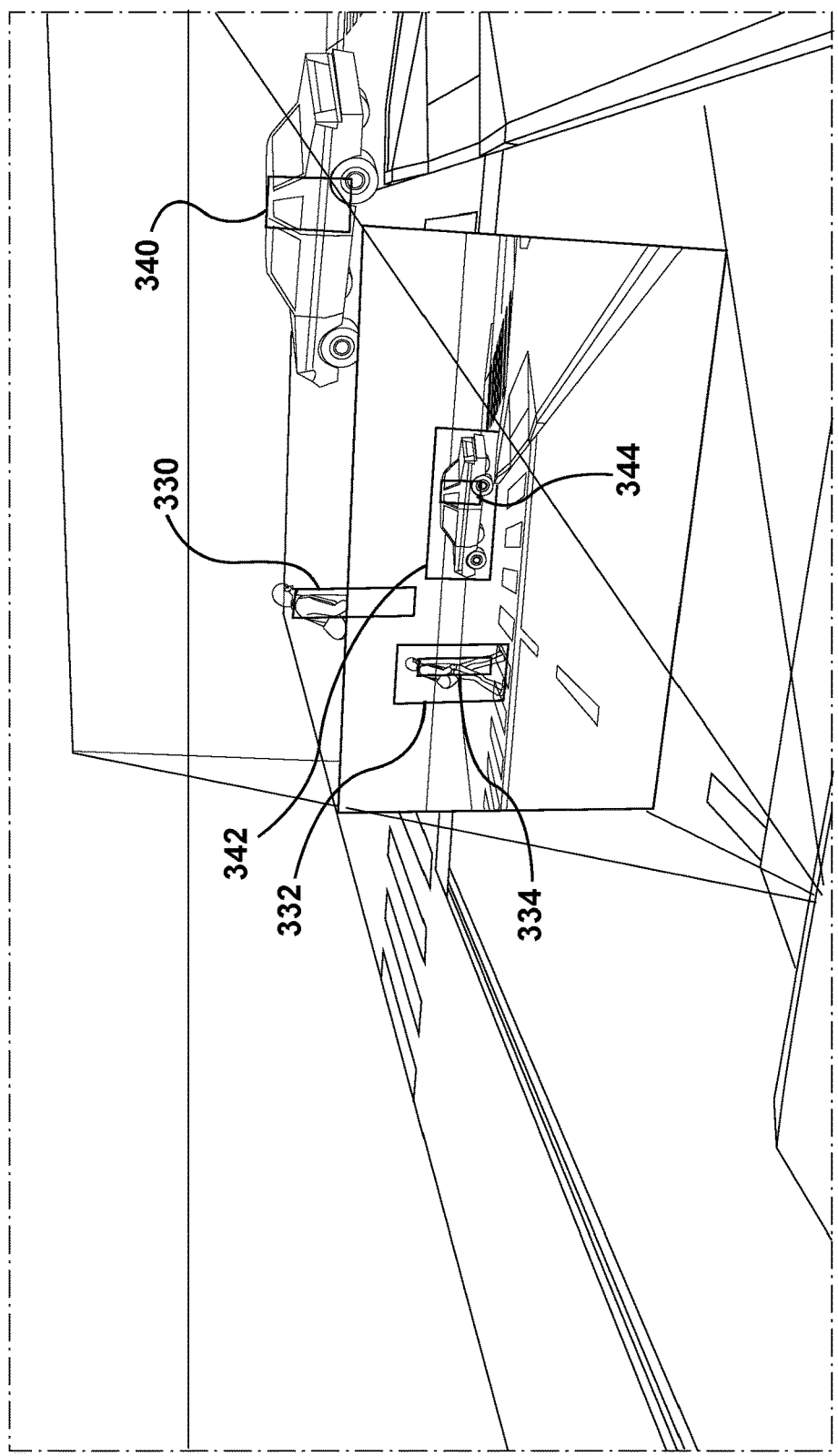
FIG. 6 depicts the correlation between newly detected two-dimensional objects-of-interest (OOI's) obtained through a camera sensor and two-dimensional projections of the previously created FO's by the automated driving system.

FIG. 6 depicts the detection of two-dimensional OOI's 332 for the pedestrian and 342 for the car based on computer vision analysis of a captured image obtained from a camera sensor. As shown by way of example in FIG. 6, the automated driving system also generates a two-dimensional projection 334 of the first FO and a two-dimensional projection 344 of the second FO. The newly obtained OOI's and these projections are characterized by a rectangle origin and a size (in terms of pixels), with the addition of classification characteristics for the OOI's obtained from the vision analysis.

Figure 7:
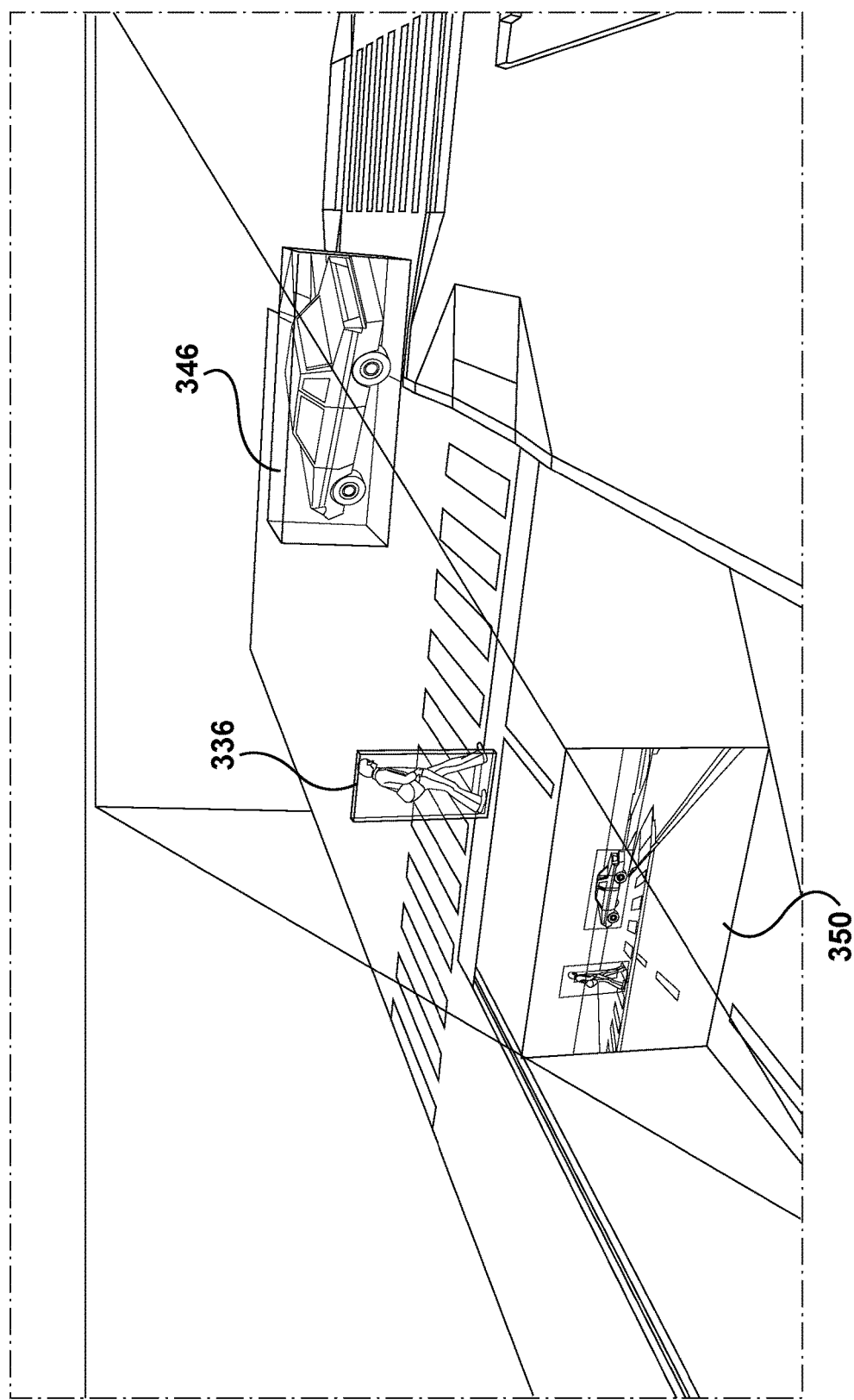
FIG. 7 depicts augmentation of the FO's with characteristics of the newly detected OOI's by the automated driving system.

FIG. 7 depicts a two-dimensional representation 350 generated from the two-dimensional OOI's obtained from vision analysis as well as the two-dimensional projections of the FO's, each for the car and for the pedestrian. Also depicted are the consolidated 336 pedestrian and 346 car FO's, the result of successfully meeting the correlation criteria and thus allowing the augmentation of the previous FO's characteristics with those of two-dimensional OOI's obtained from vision analysis by the automated driving system. The first and second consolidated FO's 336, 346 for the pedestrian and car are characterized by positional data, size, classification, velocity and certainty.

In one embodiment, the automated driving system a processor and a memory for executing an acquisition module, a characterization module, a fusion module and a decision module. These software modules may be part of the common coordinate software module 260. In other embodiments, one or more of these software modules may be combined or integrated. Each of these modules may be a replaced by a hardware or firmware module in other embodiments. In one embodiment, the software modules may be staged or cascaded such that one module listens to, or receives data from, another module, e.g. for quality-of-service information.

In one embodiment, data is packetized with standardized headers (having a predetermined format) and a payload. The standardized header describes the source and nature of the data, and may be time-stamped with a common clock, payload characteristics (e.g. size information) as well as a message digest value for the payload obtained from cryptographic hash functions such as SHA-1. This digest serves the dual purpose of validating the integrity of the data as well as authenticating the source of the data to increase system resilience to errors and potential malevolent attacks.

In at least some embodiments, data provided to the system at the acquisition stage includes image pixels or RADAR, LIDAR, satellite-based navigation (GNSS e.g. GPS), inertial measurement unit (IMU) and/or kinematic (speedometer, steering) measurements obtained from heterogeneous sensors that have been standardized and published to the system for the purposes of further characterization and fusion to achieve assisted or fully autonomous driving.

Figure 8:
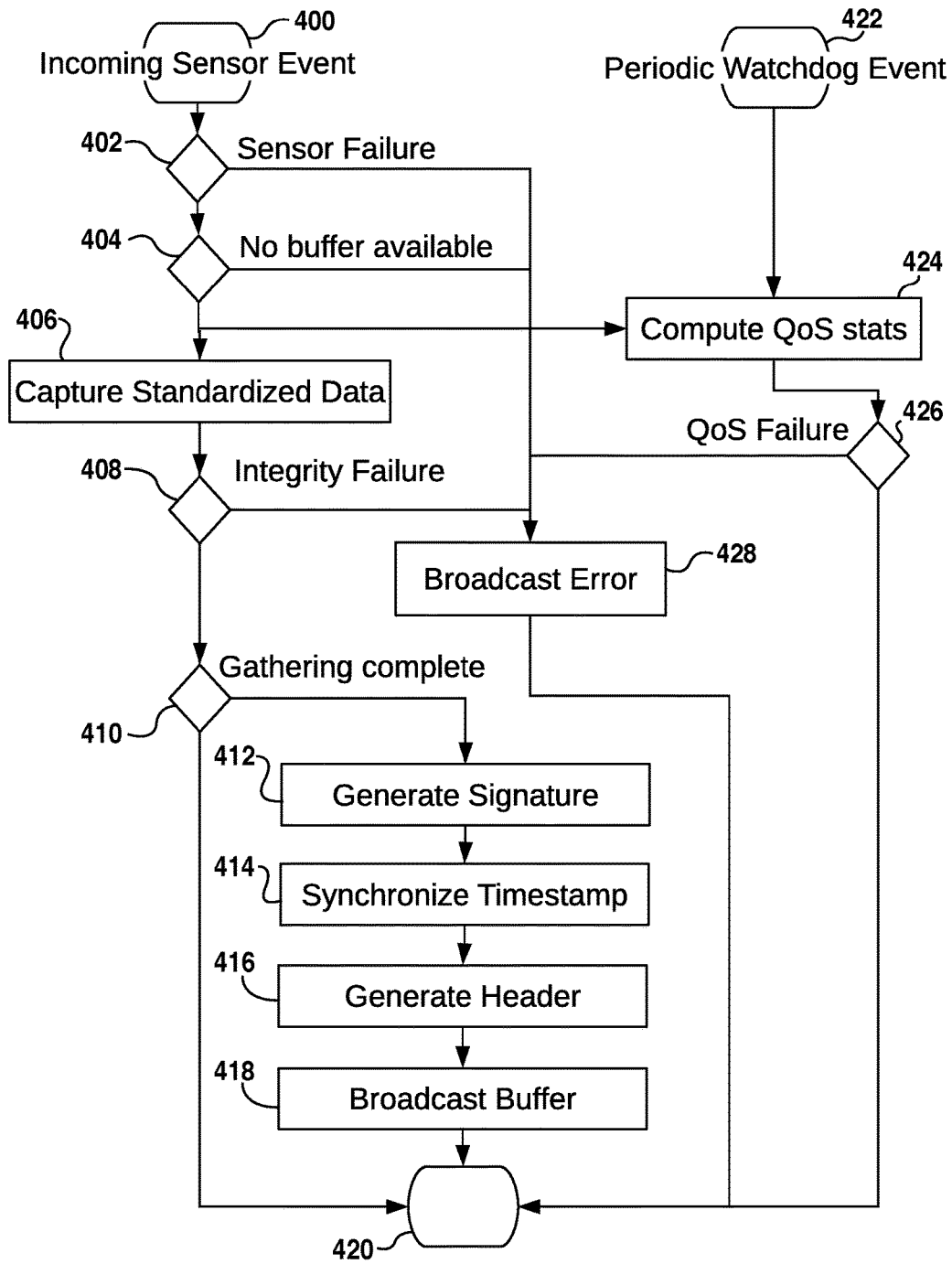
FIG. 8 is a flowchart of a method of processing an incoming sensor event.

The flowchart of FIG. 8 depicts a computer-implemented method of processing an incoming sensor event 400. The incoming sensor event 400 occurs in most embodiments within the sensor acquisition software module, triggering a check 402 to distinguish between incoming data and error reporting. If the event reports an error at step 402, the error is standardized in a report explaining the nature of the problem, for example indicating a mechanical or electrical failure, and is published (broadcast error 428) to listeners of the acquisition module and the flow is stopped 420. If the event indicates new data, the module proceeds in acquiring a memory buffer 404 to capture the data 406. If no buffer is available, the module reports or broadcasts an error 428 to the listeners and the flow is stopped 420. If such a buffer is available, the module accumulates quality-of-service (QoS) statistics 424 considering previous events. If analysis 426 of the QoS statistics detect a discontinuity or a latency issue in view of one or more criteria, it reports/broadcasts such an error 428 to the listeners but continues. Otherwise, the acquisition module captures the incoming data 406 in the acquired memory buffer 404 while simultaneously computing the digest value and storing the data into a standardized format in regards to size, units and storage, for example proceeding to store polar values, for example in millimeters and degrees, converting incoming pixels in a specific color space or packing format, or resizing data in terms of frame buffer size or unit multiples. If the computed digest does not match the expected value obtained from the header, the module reports an authentication error (or integrity failure) 408 to the listeners. If the captured data is considered to be complete (gathering complete 410) based on the system configuration, for example in terms of a complete image or scan of LIDAR and RADAR measurements, the acquisition module proceeds to publish the standardized data by generating a signature 412 and synchronizing a timestamp 414. In doing so, the module computes a digest value for the new payload and the timestamp indicating the time of the original capture but transposed to the system clock. A header is generated 416 and injected at the beginning of the memory buffer to describe the origin and nature of the data as well as the previously computed values. The buffer is then broadcast 418. Parallel to this flow, a periodic watchdog event 422 is triggered to monitor quality-of-service statistics 424 and to report potential failures 426.

In one embodiment, the system optionally executes several instances of characterization algorithms which may run in parallel, consuming the standardized captured data and generating detection information, such as position, bounds, speed and classification information, within either three-dimensional (e.g. Cartesian) or two-dimensional capture coordinate systems.

Figure 9:
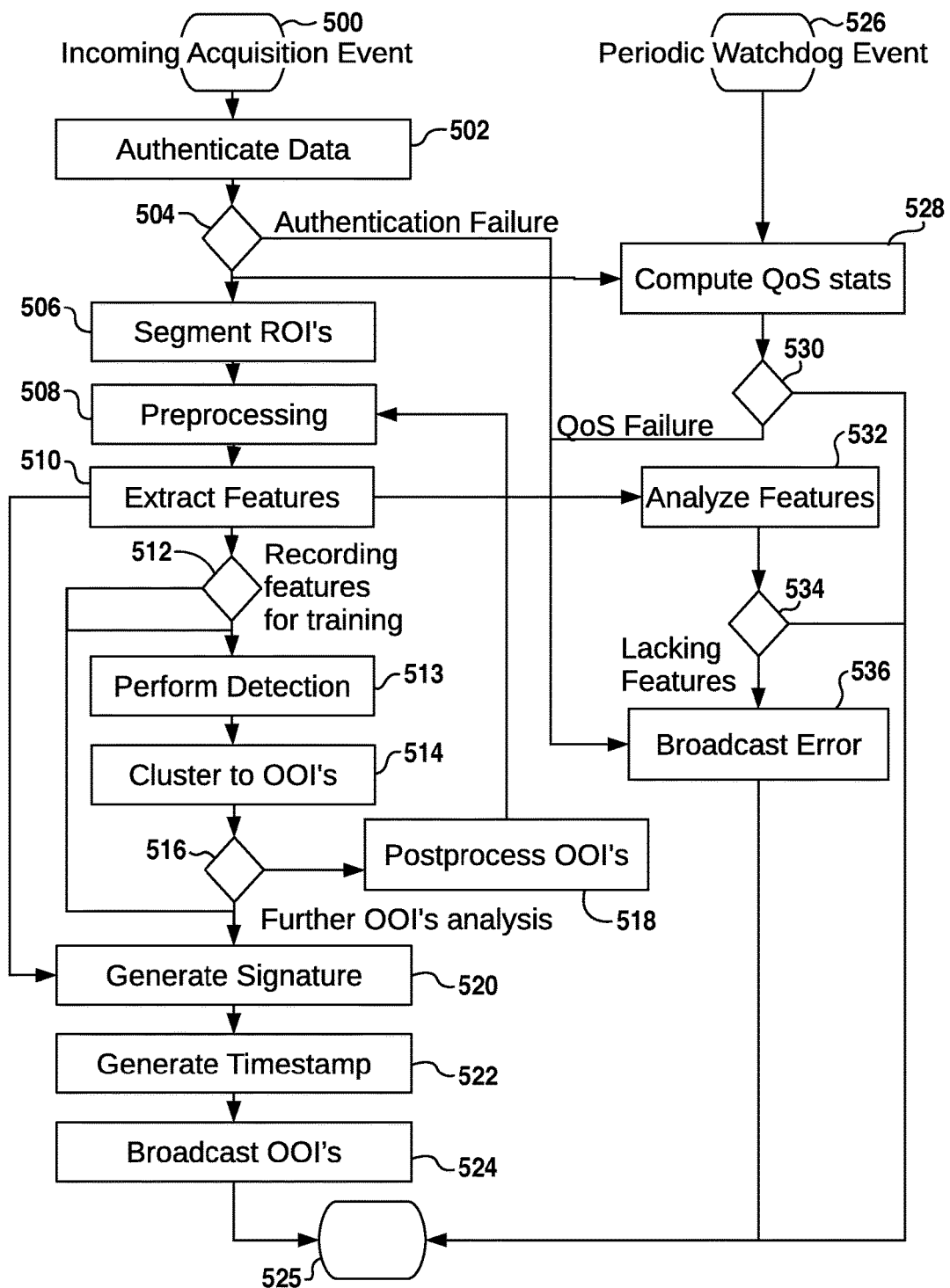
FIG. 9 is a flowchart of a method of processing an incoming acquisition event to potentially obtain an OOI.

The flowchart of FIG. 9 depicts a computer-implemented method of processing an incoming acquisition event 500.

The incoming acquisition event 500 occurs in most embodiments within the characterization software module(s), triggering a computation of the payload digest and comparison to the provided digest value within the event header to thus authenticate the data at step 502. If there is a mismatch (i.e. an authentication failure 504), the characterization module reports the error to the listeners (broadcast error 536). Otherwise, the characterization module fetches its assigned region(s)-of-interest (ROI) at step 506. For each of these ROI's, the characterization module performs preprocessing 508, e.g. filtering or conversions required by detection, and then extracting 510 of the desired features. These features can be simultaneously analyzed for quality-of-service purposes at step 532, recorded 512 for later analysis and training purposes and processed to perform detection 513 of object(s)-of-interest. In the quality-of-service case, features are analyzed 532 to given criteria like intensity (i.e. low reflectivity for LIDAR, low luminosity for camera), contrast (blurry images indicating low visibility), proximity or density (proximate dense readings indicating obstruction for LIDAR or signal propagation interference for RADAR), and thus detect poor conditions or possible obstruction, in which case an error is reported (broadcast error 536) to the listeners if a decision is made that features are lacking 534. The features can also be recorded for later analysis and potentially train classifier algorithms. But primarily, the features are then processed by classifier or detection algorithms that extract object(s)-of-interest (OOI's) and properties such as bounds and description, which are then clustered 514 based on similarity criteria (i.e. speed, overlap, proximity). The combined OOI's are then sent for further analysis (postprocessing OOI's 518) if some properties are missing (i.e. classification information such as the nature of the object) but nevertheless are published/broadcast to listeners by computing a digest (or signature) 520 and generating and injecting the original acquisition timestamp 522 and characterization processing time in a standard header and published (or broadcast) 524 to the listeners. The data flow ends at step 525. Parallel to this flow, a periodic watchdog event 526 is triggered to compute quality-of-service (QoS) statistics 528 and to determine 530 and report 536 potential QoS failures.

The system consolidates the characterization data with fusion algorithms running in parallel. Each fusion algorithm associates incoming characterization events as fused objects by keeping track of original and predicted characteristics over time. The fusion algorithms evaluate certainty levels for each of the fused objects' characteristics by weighting successful augmentations using original values and opposing (comparing) them to predictions. This eliminates spurious and instantaneous objects while instructing the decision modules in the system of the priority targets and the reliability of their characteristics.

Figure 10:
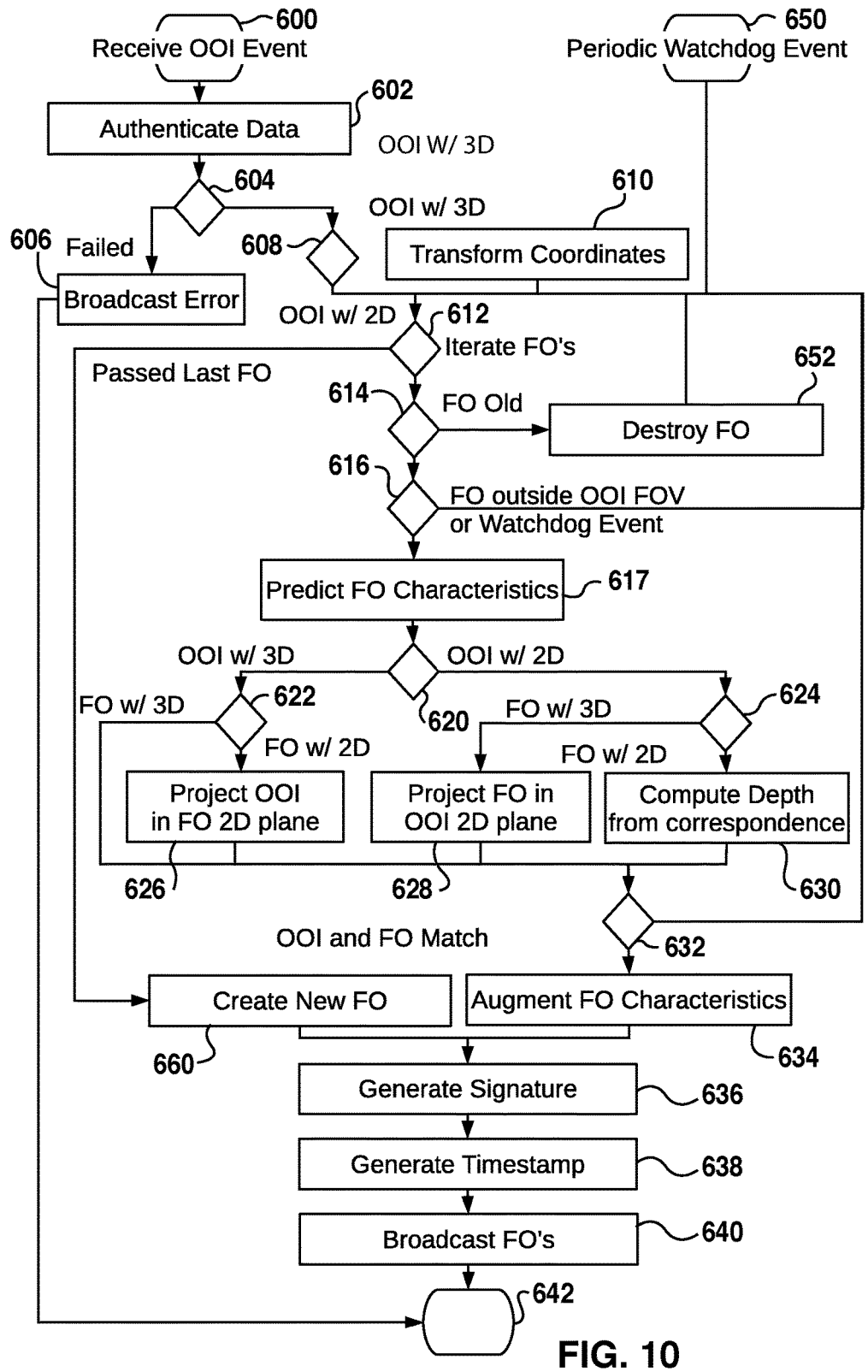
FIG. 10 is a flowchart of a method of processing an object-of-interest (OOI) event to potentially obtain a FO.

The flowchart of FIG. 10 depicts a computer-implemented method of processing an incoming object-of-interest (OOI) event 600. The incoming OOI event 600 occurs in most embodiments within the fusion software module(s), triggering a computation of the payload digest and comparison to the provided digest value within the event header, i.e. by authenticating the data at step 602. If there is a mismatch or failure at step 604, the fusion module reports or broadcasts the error 606 to the listeners. Otherwise, the fusion module(s) performs processing of each individual OOI from the list obtained in the event. The fusion module first checks 608 if the OOI contains full three-dimensional Cartesian coordinates and transforms 610 the coordinates to reflect the extrinsic properties (i.e. position and orientation on the vehicle) of the originating sensor and transpose them to the vehicle coordinate system. The fusion module iterates 612 the Fused Objects (FO's) characteristics stored by the fusion module and evaluates the age of the FO by evaluating 614 the last considered OOI used in augmentation. If the object is considered too old by the evaluation criteria at the age-evaluating step 614, the object is destroyed 652 (i.e. deleted) and the fusion module iterates to the next FO. Otherwise, the fusion module evaluates at the FOV-evaluating step 616 if the FO is within the field-of-view (FOV) of the sensor that originated the OOI, and if not the fusion module iterates to the next FO. If the FOV is a match, the fusion module predicts 617 each of the available FO characteristics using the incoming OOI timestamp value, decreasing the certainty level of the affected characteristics by re-evaluating a predetermined time interval containing both original and predicted values. The fusion module then proceeds to evaluate at step 620 if the OOI has 3D Cartesian characteristics or only 2D characteristics. If the OOI has 3D Cartesian characteristics, and the FO also has 3D Cartesian characteristics, the fusion module proceeds to compare 624 the similarities. If the FO only has 2D characteristics, it proceeds to project 626 the 3D characteristics of the OOI into the FO 2D space using the FO's originating sensor intrinsic (i.e. focal length, range, sensor size, field of view) and extrinsic properties and then proceed to compare similarities 632. If the OOI only had 2D characteristics and the FO has 3D characteristics, the fusion module projects 628 the 3D characteristics of the FO into the 2D space of the OOI and proceeds to compare similarities 632.

If the OOI and FO only have 2D characteristics, the fusion module proceeds to evaluate correspondence 630 by computing depth through triangulation given the originating sensors' intrinsic and extrinsic differences, and then proceeds to compare similarities 632. If there was no match, the fusion module iterates to the next FO. If there is a match, the system will proceed to augment 634 the fused object (i.e. augment FO characteristics) and when necessary will convert 2D characteristics given available depth information and the originating sensor intrinsic and extrinsic properties. In augmenting the characteristics, the fusion module adds the original OOI characteristics and originating sensor intrinsic and extrinsic information to the FO history for the incoming timestamp. The original characteristics are stored in the history of the FO and computed to provide a combined value, with the correlation of several OOI over time and over multiple sensors increasing the certainty level of the affected characteristic. Predictions are made for all subsequent timestamps in the Fused Object history up to the current system time. If after iterating through all the FO's the fusion module finds no match, a new FO object is created 660 with the OOI characteristics. Once this processing has been applied to all incoming OOI events, the fusion module generates a list of the FO's, computes the digest value (i.e. generates a signature 636) for the payload, generates and inserts a timestamp 638 in a standardized header and then publishes (i.e. broadcasts) 640 the data to its listeners. The data flow ends at 642. A periodic watchdog event 650 may be employed in a manner analogous to what was described above for FIGS. 8 and 9.

Such a system is expected to have one or several decision modules that implement desired assistive or autonomous features such as collision avoidance and trajectory planning. These modules process the output of the fusion module as well as the quality-of-service information obtained from the acquisition and characterization modules in regards to availability of sensors. Acquisition or characterization errors are considered and, when lacking redundancy, the system implements protective measures accordingly. For example, the system may disable assisted features, notify the driver of the failure or pull over the vehicle to the side of the road in a safe manner when implementing full autonomy. When receiving fused objects, the certainty level of the characteristics are considered and modulate the response accordingly. The system should only implement the highest level of autonomy when full characteristics and high certainly levels are obtained. For example, an object in the trajectory of the system possessing a depth but no credible contouring information should cause the system to reduce its speed (e.g. by braking) but not steering (avoidance or lane change). Objects with initially low certainly level for depth should be monitored closely but are not acted upon until a certain threshold is reached.

Any of the methods disclosed herein may be implemented in hardware, software, firmware or any combination thereof. Where implemented as software, the method steps, acts or operations may be programmed or coded as computer-readable instructions and recorded electronically, magnetically or optically on a fixed, permanent, non-volatile or non-transitory computer-readable medium, computer-readable memory, machine-readable memory or computer program product. In other words, the computer-readable memory or computer-readable medium comprises instructions in code which when loaded into a memory and executed on a processor of a computing device cause the computing device to perform one or more of the foregoing method(s).

A computer-readable medium can be any means that contain, store, communicate, propagate or transport the program for use by or in connection with the instruction execution system, apparatus or device. The computer-readable medium may be electronic, magnetic, optical, electromagnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

It is to be understood that the singular forms "a," "an," and "the" include plural referents unless the context clearly dictates otherwise. Thus, for example, reference to "a processor" includes reference to one or more of such processors.

This invention has been described in terms of specific embodiments, implementations and configurations which are intended to be exemplary only. Persons of ordinary skill in the art will appreciate, having read this disclosure, that many obvious variations, modifications and refinements may be made without departing from the inventive concept(s) presented herein. The scope of the exclusive right sought by the Applicant(s) is therefore intended to be limited solely by the appended claims.

The invention claimed is:

1. An automated driving system for a vehicle, the system comprising:
   a first sensor providing first sensor data about an object of interest, wherein the first sensor data comprises 3D characteristics;
   a second sensor providing second sensor data about the object of interest, wherein the first and second sensors are different types of sensors, wherein the second sensor data comprises 2D characteristics; and
   a processor communicatively coupled to the first sensor and the second sensor, wherein the processor is configured to:
   process the first and second sensor data for the object of interest by transforming the first or second sensor data into a common coordinate system, by comparing similarities between the characteristics of the object of interest and a fused object in the common coordinate system to determine if the object of interest and the fused object match, and augmenting the fused object with the characteristics of the object of interest if the object of interest and the fused object match; and
   generate one or more drive control signals to control a motion of the vehicle in response to the fused object.

2. The system of claim 1 wherein the first sensor is RADAR and wherein the second sensor is a camera.

3. The system of claim 1 wherein the first sensor is LIDAR and wherein the second sensor is a camera.

4. The system of claim 1 wherein the processor is configured to apply a first weight to the first sensor data and a second weight to the second sensor data, wherein the first weight and the second weight are variable based on ambient light.

5. The system of claim 4 wherein the first weight and second weight are based on manufacturer-specified sensitivity data.

6. A non-transitory computer-readable medium comprising instructions in code which when loaded into a memory and executed by a processor of a vehicle cause the processor to:
   receive first sensor data about an object of interest from a first sensor, wherein the first sensor data comprises 3D characteristics;
   receive second sensor data about the object of interest from a second sensor of a type different from the first sensor, wherein the second sensor data comprises 2D characteristics;
   process the first and second sensor data for the object of interest by transforming the first or second sensor data into a common coordinate system, by comparing similarities between the characteristics of the object of interest and a fused object in the common coordinate system to determine if the object of interest and the fused object match, and augmenting the fused object with the characteristics of the object of interest if the object of interest and the fused object match; and
   generate one or more drive control signals to control a motion of the vehicle in response to the fused object.

7. The computer-readable medium of claim 6 wherein the first sensor is RADAR and wherein the second sensor is a camera.

8. The computer-readable medium of claim 6 wherein the first sensor is LIDAR and wherein the second sensor is a camera.

9. The computer-readable medium of claim 6 wherein the code causes the processor to apply a first weight to the first sensor data and a second weight to the second sensor data, wherein the first weight and the second weight are variable based on ambient light.

10. The computer-readable medium of claim 9 wherein the first weight and second weight are based on manufacturer-specified sensitivity data.

11. A vehicle comprising:
a powertrain;
a braking system;
a steering system;
an automated driving system for at least partially controlling one or more of the powertrain, braking system and steering system;
wherein the automated driving system includes:
a first sensor providing first sensor data about an object of interest, wherein the first sensor data comprises 3D characteristics;
a second sensor providing second sensor data about the object of interest, wherein the first and second sensors are different types of sensors, wherein the first sensor data comprises 2D characteristics; and
a processor communicatively coupled to the first sensor and the second sensor, wherein the processor is configured to:
process the first and second sensor data for the object of interest by transforming the first or second sensor data into a common coordinate system to compare similarities between the characteristics of the object of interest and a fused object in the common coordinate system to determine if the object of interest and the fused object match, and augmenting the fused object with the characteristics of the object of interest if the object of interest and the fused object match; and
generate one or more drive control signals to control a motion of the vehicle in response to the fused object.

12. The vehicle of claim 11 wherein the first sensor is RADAR and wherein the second sensor is a camera.

13. The vehicle of claim 11 wherein the first sensor is LIDAR and wherein the second sensor is a camera.

14. The vehicle of claim 11 wherein the processor is configured to apply a first weight to the first sensor data and a second weight to the second sensor data, wherein the first weight and the second weight are variable based on ambient light.

15. The vehicle of claim 14 wherein the first weight and second weight are based on manufacturer-specified sensitivity data.

* * * * *